United States Patent
Paxton et al.

(10) Patent No.: US 9,646,388 B2
(45) Date of Patent: May 9, 2017

(54) INTEGRATED IMAGE DISTORTION CORRECTION WITH MOTION COMPENSATED INTEGRATION

(71) Applicant: The Boeing Company, Chicago, IL (US)

(72) Inventors: Kevin Paxton, Placentia, CA (US); Scott Myers Peterson, Albuquerque, NM (US); Scott Andrew Connors, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 329 days.

(21) Appl. No.: 14/593,571

(22) Filed: Jan. 9, 2015

(65) Prior Publication Data

US 2016/0203613 A1  Jul. 14, 2016

(51) Int. Cl.
| | |
|---|---|
| H04N 7/18 | (2006.01) |
| G06K 9/68 | (2006.01) |
| G06T 7/20 | (2017.01) |
| B60R 1/00 | (2006.01) |
| G06T 5/00 | (2006.01) |
| H04N 5/33 | (2006.01) |

(52) U.S. Cl.
CPC .............. *G06T 7/20* (2013.01); *B60R 1/00* (2013.01); *G06T 5/006* (2013.01); *H04N 5/33* (2013.01)

(58) Field of Classification Search
CPC .............. G06T 7/20; G06T 5/006; H04N 5/33
See application file for complete search history.

(56) References Cited

U.S. PATENT DOCUMENTS

| | | | |
|---|---|---|---|
| 6,714,240 B1 | 3/2004 | Caswell | |
| 8,964,047 B2* | 2/2015 | Robinson | G06T 3/00 348/208.1 |
| 2006/0188169 A1* | 8/2006 | Tener | G06T 5/20 382/254 |
| 2009/0225165 A1* | 9/2009 | Reneker | G01C 11/02 348/144 |
| 2010/0014769 A1* | 1/2010 | Lundgren | H04N 5/349 382/255 |

* cited by examiner

*Primary Examiner* — Dave Czekaj
*Assistant Examiner* — Tsion B Owens
(74) *Attorney, Agent, or Firm* — Miller, Matthias & Hull LLP (57) ABSTRACT

A motion compensated integration (MCI) system is disclosed. The MCI system may include a moveable platform, an optical sensor mounted to the moveable platform, an optical sensor line-of-sight measuring device configured to generate optical sensor line-of-sight movement data, and a processor in communication with the optical sensor and the optical sensor line-of-sight measuring device. The optical sensor may include a set of optics, and a focal plane array. The focal plane array may be configured to detect infrared wavelengths focused through the set of optics, and generate focal plane array data. The processor may be configured to simultaneously correct optical distortion from the set of optics and perform MCI re-registration based on the focal plane array data and the optical sensor line-of-sight movement data.

20 Claims, 9 Drawing Sheets

INTEGRATED IMAGE DISTORTION CORRECTION WITH MOTION COMPENSATED INTEGRATION

FIELD OF THE DISCLOSURE

The present disclosure relates generally to imaging and tracking systems and, more particularly, to motion compensated integration in imaging and tracking systems and methods.

BACKGROUND OF THE DISCLOSURE

Imaging and tracking systems typically include sensors to identify and track objects. For example, some sensors, such as radar systems, send out signals that reflect from objects and are received by the system. Other sensors, such as electro-optical sensors, receive electromagnetic radiation signals from the objects themselves. Improvements in this field have been directed to refining these sensors to be more accurate.

In particular, electro-optical sensors typically use telescopes and focal plane arrays that detect infrared radiation. Suppression of fixed pattern noise is one area of development in electro-optical sensors. Generally, calibration or non-uniformity correction has been used to suppress fixed pattern noise. However, this method of fixed pattern suppression may leave a large residual fixed pattern which limits sensor performance and increases sensor noise levels. In addition, there may be instances when calibration cannot be performed prior to use, and the system must be used in a moment's notice.

Tracking objects using an optical sensor with a telescope and focal plane array on a moving platform presents additional problems, such as, a need to compensate for the movement of the moving platform. Furthermore, optical distortion caused by the system's optical components, such as from imperfect lenses, reflectors, etc., may cause localized stretching within the image. Correction of each of these problems using separate processes may contribute to an increase in unwanted random noise related to the optical sensor and associated electronics. The signal-to-noise ratio (SNR) of the system quantifies the amount of object signal or object intensity that is present above any unwanted random noise. A higher SNR generally correlates to a higher probability for detecting the object of interest. Accordingly, improvements in electro-optical sensors are needed to suppress fixed pattern noise and increase the system's SNR.

SUMMARY OF THE DISCLOSURE

In accordance with one embodiment, a motion compensated integration (MCI) system is disclosed. The MCI system may include a moveable platform, an optical sensor mounted to the moveable platform, an optical sensor line-of-sight measuring device configured to generate optical sensor line-of-sight movement data, and a processor in communication with the optical sensor and the optical sensor line-of-sight measuring device. The optical sensor may include a set of optics, and a focal plane array. The focal plane array may be configured to detect infrared wavelengths focused through the set of optics, and generate focal plane array data. The processor may be configured to simultaneously correct optical distortion from the set of optics and perform MCI re-registration based on the focal plane array data and the optical sensor line-of-sight movement data.

In a refinement, the processor may be further configured to use bi-linear interpolation to simultaneously correct optical distortion and perform MCI re-registration.

In another refinement, the processor may be further configured to sample a raw frame of focal plane array data.

In another refinement, the processor may be further configured to re-sample the raw frame of focal plane array data only once to account for both optical distortion correction and MCI re-registration.

In another refinement, the processor may be further configured to perform sub-pixel shifting of the raw frame of focal plane array data.

In another refinement, re-sampling of the raw frame of focal plane array data only once to account for both optical distortion correction and MCI re-registration may increase a signal-to-noise ratio of the MCI system.

In another refinement, the processor may be further configured to perform fixed pattern noise estimation and removal before simultaneously correcting optical distortion and performing MCI re-registration.

In another refinement, the processor may be further configured to perform digital fixed pattern filtering.

In another refinement, the processor may be further configured to use infinite impulse response filtering to estimate fixed pattern noise.

In another refinement, the processor may be further configured to perform MCI integration in order to produce a master frame.

In another refinement, the processor may be implemented as part of a field programmable gate array.

In another refinement, the focal plane array may be comprised of at least one of long band detectors and short band detectors.

In another refinement, the focal plane array may be comprised of visible detectors.

In accordance with another embodiment, a method for improving a signal-to-noise ratio for an imaging and tracking system on a moving vehicle platform is disclosed. The imaging and tracking system may include a focal plane array and a processor. The method may include the processor receiving a raw frame of focal plane array data from the focal plane array; the processor performing fixed pattern noise suppression on the raw frame of focal plane array data; and the processor performing a combined optical distortion correction and motion compensated integration (MCI) re-registration on the raw frame of focal plane array data.

In a refinement, the method may further include the processor using bi-linear interpolation to perform the combined optical distortion correction and MCI re-registration.

In another refinement, the method may further include performing sub-pixel shifting of the raw frame of focal plane array data.

In another refinement, the method may further include the processor using infinite impulse response filtering.

In accordance with another embodiment, a method for increasing a signal-to-noise ratio for a motion compensated integration (MCI) system is disclosed. The MCI system may include an optical sensor mounted on a moveable platform, an optical sensor line-of-sight measuring device, and a processor in communication with the optical sensor and the optical sensor line-of-sight measuring device. The optical sensor may include a set of optics and a focal plane array. The method may include the focal plane array acquiring focal plane array data; the optical sensor line-of-sight measuring device acquiring optical sensor line-of-sight movement data; the processor receiving the focal plane array data and the optical sensor line-of-sight movement data; the processor performing fixed pattern noise estimation and removal on the focal plane array data; and the processor using bi-linear interpolation on the focal plane array data to perform a combined optical distortion correction and MCI re-registration based at least in part on the optical sensor line-of-sight movement data.

In a refinement, the method may further include the processor performing MCI integration on the focal plane array data in order to produce a master frame.

In another refinement, the method may further include the processor performing infinite impulse response filtering for the fixed pattern noise estimation.

These and other aspects and features will become more readily apparent upon reading the following detailed description when taken in conjunction with the accompanying drawings. In addition, although various features are disclosed in relation to specific exemplary embodiments, it is understood that the various features may be combined with each other, or used alone, with any of the various exemplary embodiments without departing from the scope of the disclosure.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
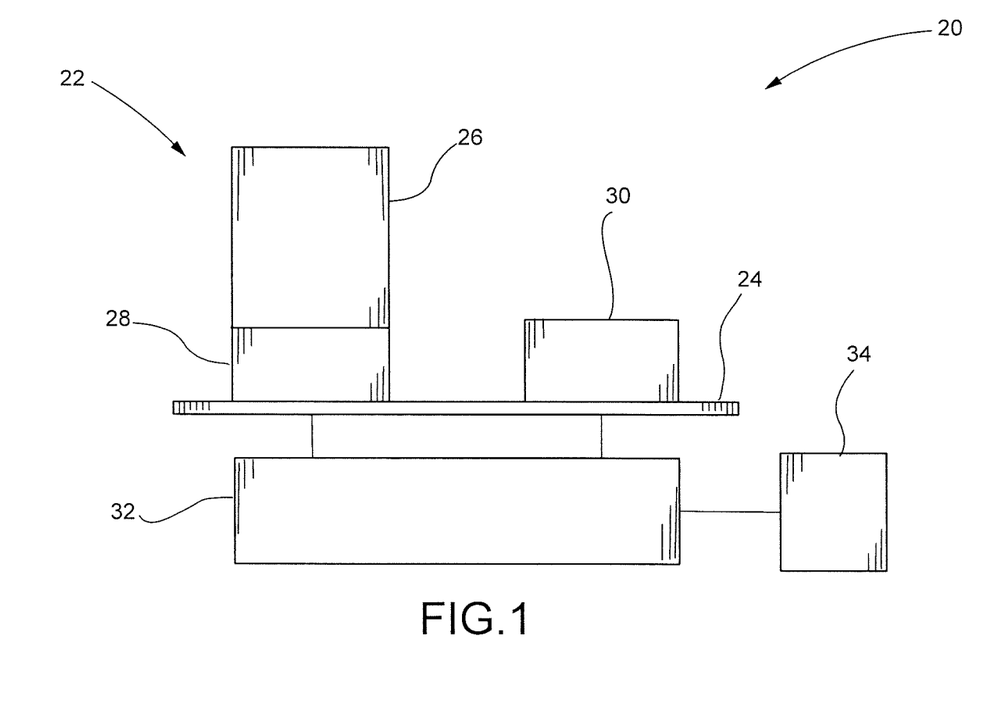
FIG. 1 is a schematic representation of a motion compensated integration (MCI) system in accordance with one embodiment of the present disclosure.

FIG. 1 schematically illustrates a motion compensated integration (MCI) system 20, in accordance with an embodiment of the present disclosure. The MCI system 20 may comprise an optical sensor 22 fixedly mounted to a moveable platform 24. For example, the moveable platform 24 may be an advanced kill vehicle. However, other applications, such as missiles, satellites, space vehicles, air vehicles, aircraft, ground vehicles, watercraft, and the like, may be used.

The optical sensor 22 may include a set of optics 26 and a focal plane array 28. For example, the set of optics 26 may be part of a telescope and may include one or more lenses, reflectors, etc. The focal plane array 28 may comprise a physical array of detectors configured to detect infrared or other wavelengths focused through the set of optics 26, and may generate focal plane array data indicative of the same. For example, the detectors of the focal plane array 28 may comprise long band detectors and/or short band detectors, although other types of detectors, such as visible detectors, may be used.

In addition, the MCI system 20 may include an optical sensor line-of-sight (LOS) measuring device 30 configured to measure line-of-sight movement of the optical sensor 22 and generate optical sensor LOS movement data indicative of same. For example, the optical sensor LOS measuring device 30 may comprise an inertial measurement unit (IMU) including a triad of gyroscopes. However, other configurations for the optical sensor LOS measuring device 30 may be used.

In communication with the optical sensor 22 and the optical sensor LOS measuring device 30, a processor 32 may process the focal plane array data to produce an output image 34, using the optical sensor LOS movement data to compensate for the movement of the platform 24. The processor 32 may be implemented as part of a field programmable gate array. However, other suitable means for electronically processing the focal plane array data and the optical sensor LOS movement data may be used. The processor 32 may be configured to operate according to predetermined algorithms or sets of instructions for processing data generated by the MCI system 20.

Figure 2:
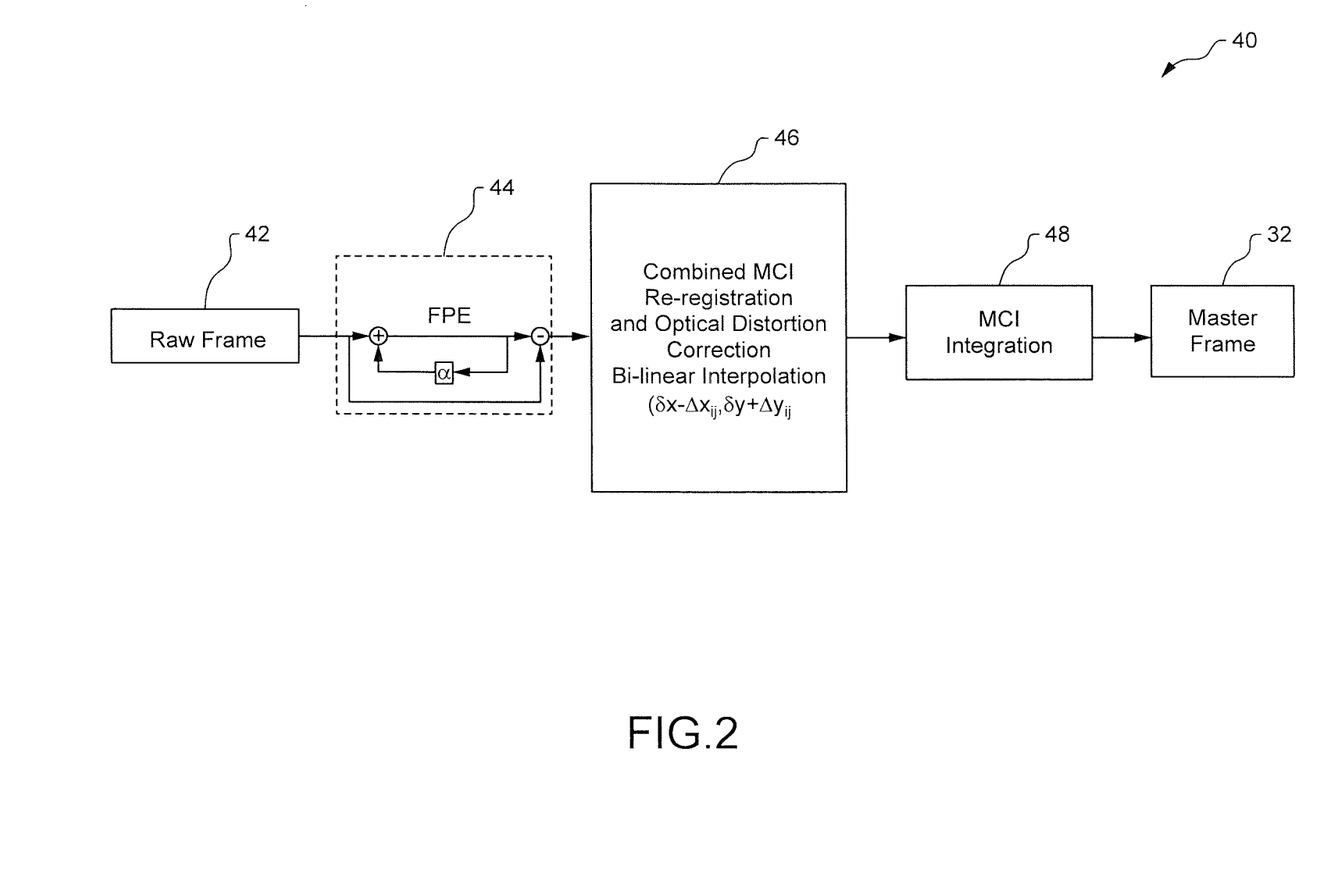
FIG. 2 is a diagrammatic view of a process for processing data generated by the MCI system of FIG. 1, in accordance with an embodiment of the present disclosure.
Figure 3:
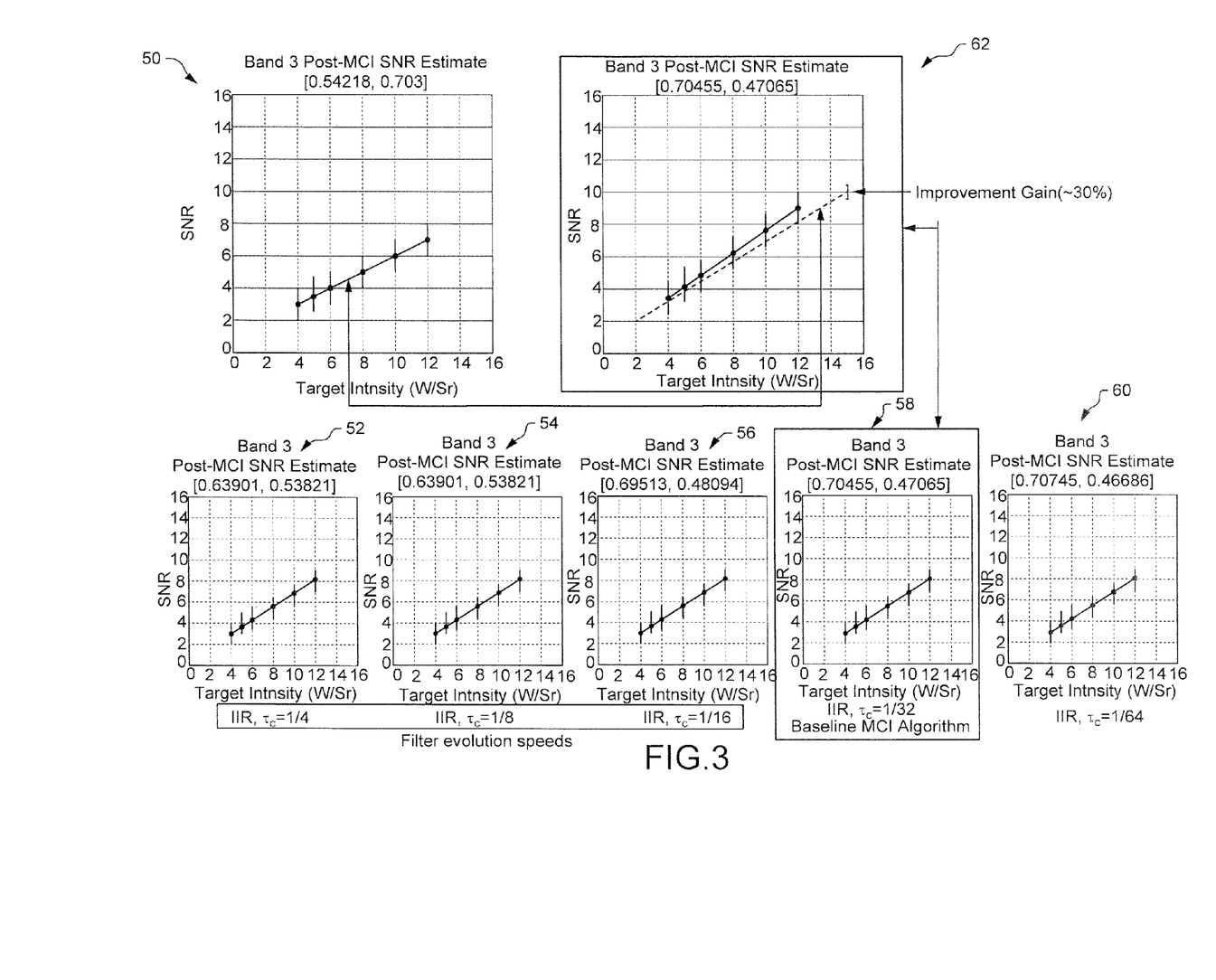
FIG. 3 is a graphical view of computer simulated results showing an improved SNR with the MCI system of FIG. 1.

Turning now to FIG. 2, with continued reference to FIG. 1, a sub-pixel, digital filtering process 40 for processing data generated by the MCI system 20 is shown. The processor 32 may sample a raw frame 42 of focal plane array data received by the focal plane array 28. At module 44, the processor 32 may suppress fixed pattern noise (FPN). More specifically, the processor 32 may perform FPN estimation and removal using digital filtering methodology. Frames may be averaged to produce an estimate of the FPN, which may then be subtracted out of each incoming frame in order to reduce the effect of FPN.

For example, the processor 32 may use infinite impulse response filtering or digital signal processing techniques. Infinite impulse response filtering may continually use information from all of the input frames to update the FPN estimate. Information from all input frames are used in a continuous way by weighing each new input frame and accumulating the result over the entire operating time. In so doing, the FPN estimate may evolve over time continuously and adapt to changes in FPN.

After performing FPN estimation and removal, the processor 32 may simultaneously correct optical distortion and perform MCI re-registration at module 46 via a resampling technique, such as, bi-linear interpolation. The processor 32 may be configured to perform optical distortion correction and MCI re-registration in a single combined step. In so doing, the raw frame 42 of focal plane array data may be resampled only once, thereby significantly reducing noise and increasing SNR. Furthermore, resampling or shifting of the raw frame 42 of focal plane array data may be performed at a sub-pixel level in order to more accurately account for LOS motion and achieve sharper SNR improvement.

More specifically, the processor 32 may calculate an amount of sub-pixel shifting needed to correct optical distortion based on predetermined correction offsets for the set of optics 26. The processor 32 may also calculate an amount of MCI re-registration, or sub-pixel shifting needed to compensate for LOS motion based on the optical sensor LOS movement data. The amount of sub-pixel shifting needed for optical distortion correction and the amount of sub-pixel shifting needed for MCI re-registration may be added together to produce a total amount of sub-pixel shifting.

One single resampling process of the raw frame 42 of focal plane array data may be done based on the total amount of sub-pixel shifting calculated. For example, using bi-linear interpolation (or any higher order interpolation operation), the processor 32 may assign appropriate intensity values to the pixel array based on the total amount of sub-pixel shifting calculated in order to re-map the raw frame 42 of focal plane array data. Thus, shifting of the raw frame 42 is applied only once for both the optical distortion correction and the MCI re-registration processes, as compared to a first separate shifting application for optical distortion correction and a second separate shifting application for MCI re-registration.

At module 48, the processor 32 may perform MCI integration in order to produce a master frame or output image 34. During MCI integration, the processor 32 may be configured to stack up a plurality of raw frames, which have each undergone FPN suppression and resampling for the combined optical distortion correction/MCI re-registration, into one master frame. It is to be understood that other modules or components may be added to the process 40. Furthermore, more or less steps in a same or different order than that shown and described may be included without departing from the scope of the disclosure.

As shown in the sensor testing and computer simulation result charts of FIGS. 3-7, the SNR of the MCI system 20 is significantly improved over the prior art. For example, in FIG. 3, computer simulation analysis was performed using a fixed grid of known position and intensity objects. Allowing the object intensities to vary, SNR was computed at the known locations in the focal plane array 28. A linear response of the computed SNR was plotted against the known object intensities for the prior art discrete pixel shift process in plot 50, as well as for the presently disclosed sub-pixel, digital filtering process 40 for several filter time constants and adaptation speeds in plots 52, 54, 56, 58, and 60. In plot 62, the SNR response for the sub-pixel, digital filtering process 40 resulted in an approximately thirty percent (30%) gain per unit intensity over the prior art discrete pixel shift process in plot 50.

In other examples, shown in FIGS. 4-7, error analysis was performed using Monte Carlo simulation methods. Error may accumulate when interpolation operations are applied to raw frames independent of MCI re-registration. Combining optical distortion correction and MCI re-registration shifts reduce the error to negligible amounts. With Monte Carlo simulation methods, a large number of test objects were modeled within the focal plane array 28 along with their associated random properties for each instance. In so doing, statistical effects or averaged performance were evaluated.

Figure 4:
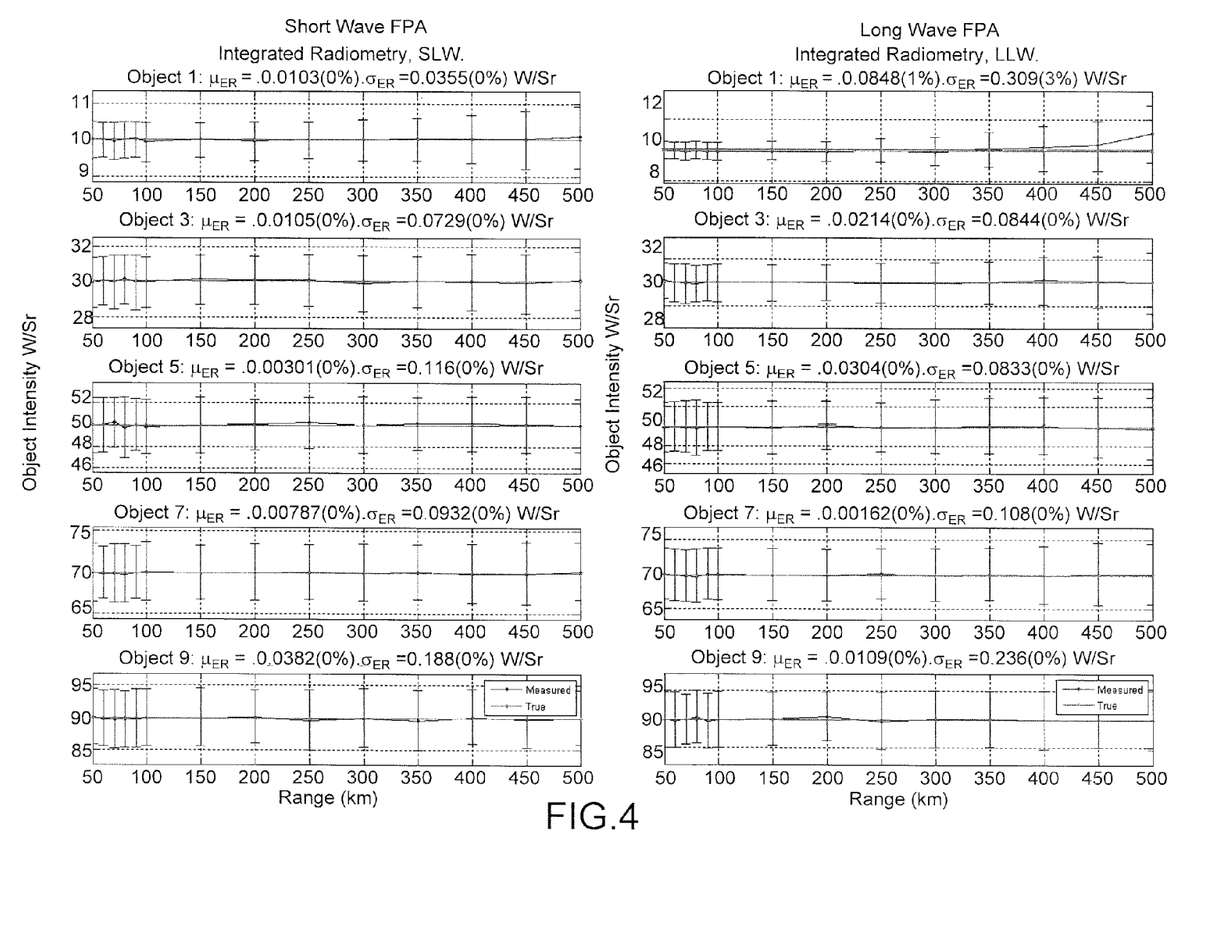
FIG. 4 is a graphical view of computer simulated results with radiometric calibration error and variance measures with no optical distortion.
Figure 5:
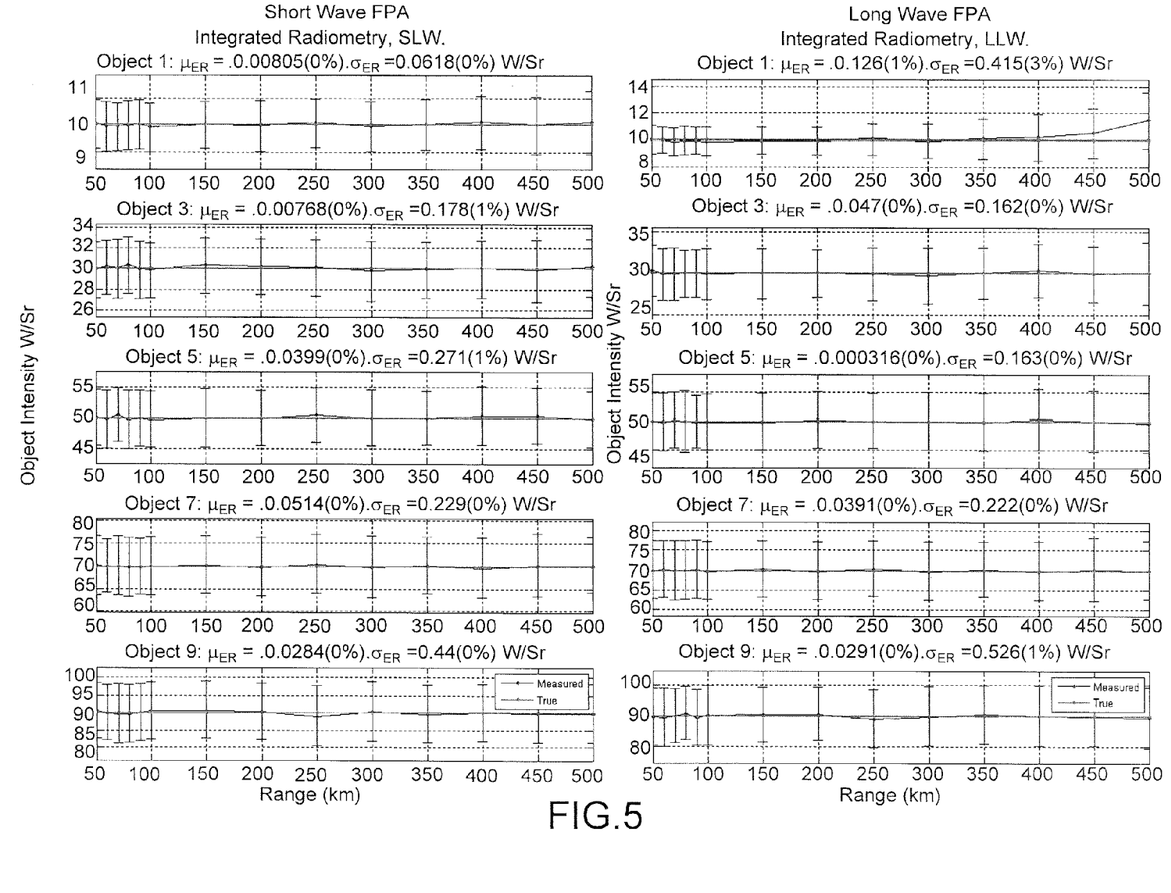
FIG. 5 is a graphical view of computer simulated results with radiometric calibration error and variance measures with independent optical distortion correction and MCI re-registration processes.
Figure 6:
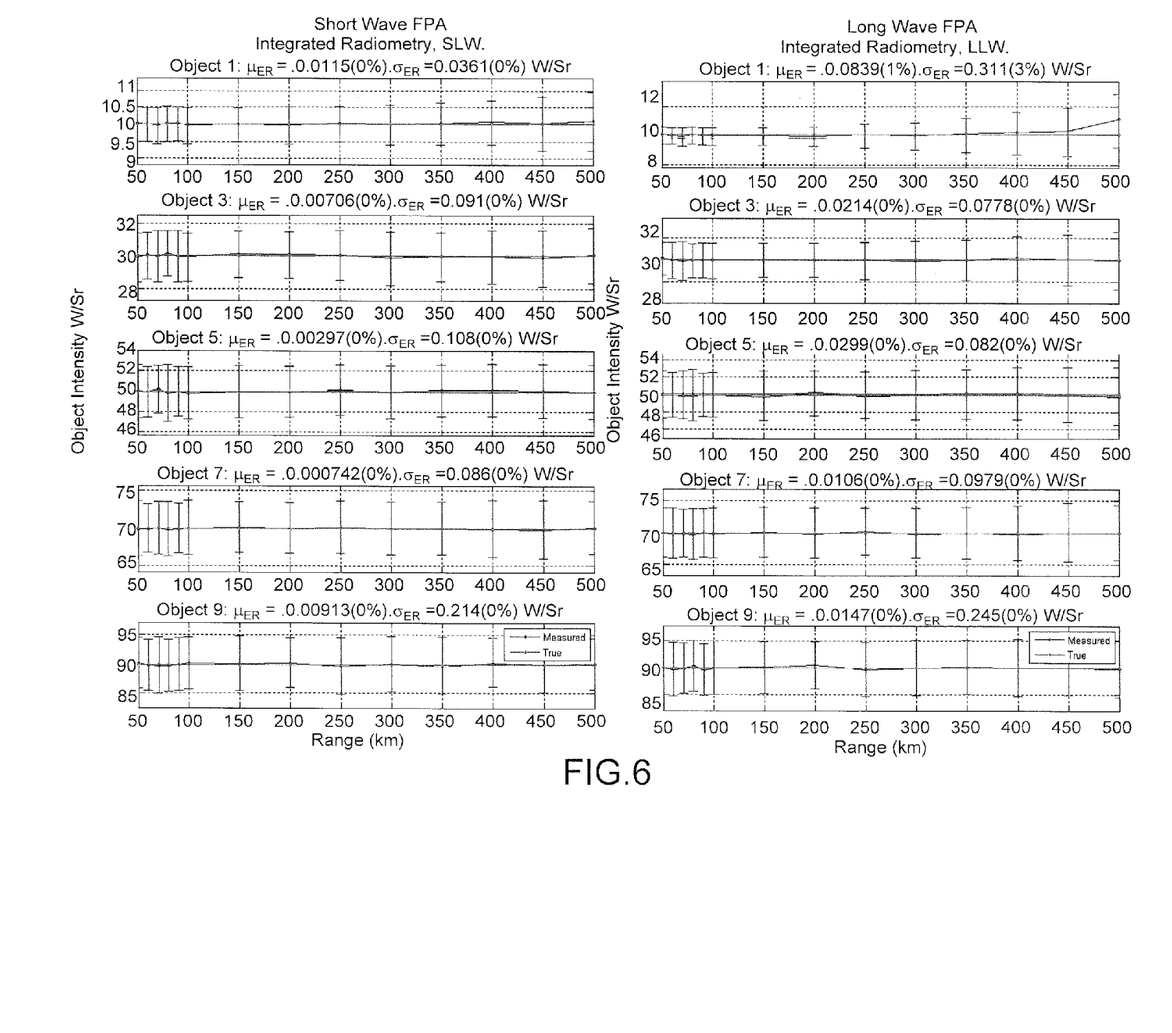
FIG. 6 is a graphical view of computer simulated results with radiometric calibration error and variance measures with coincident optical distortion correction and MCI re-registration process.

More specifically, improved error reduction was confirmed by computer simulation with radiometric calibration, as shown in FIGS. 4-6. Using radiometric calibration, known intensity objects were inserted into the focal plane array 28, and optical distortion correction and/or MCI re-registration processes were performed. The raw frames were integrated to produce the master frame, which was examined at the known object locations for measured intensity in three steps.

For the first step, in FIG. 4, no optical distortion was applied in order to show a near exact detection of input intensities. For the second step, in FIG. 5, optical distortion was applied to the raw frames and subsequently corrected to the raw frames before MCI re-registration in order to show the effect of double interpolation, or two separate shifting processes. As shown in FIG. 5, double interpolation resulted in considerably higher error variances, as compared to the case where no optical distortion was applied in FIG. 4.

For the third step, in FIG. 6, optical distortion was applied and corrected coincident with MCI re-registration in order to show the effect of a single interpolation for the combined processes. As shown in FIG. 6, the single interpolation for the combined processes resulted in mean values and error variances consistent with the case where no optical distortion was applied in FIG. 4. Thus, when optical distortion correction was applied coincident with MCI re-registration, there were negligible mean differences and error variances in measured intensity.

Figure 7:
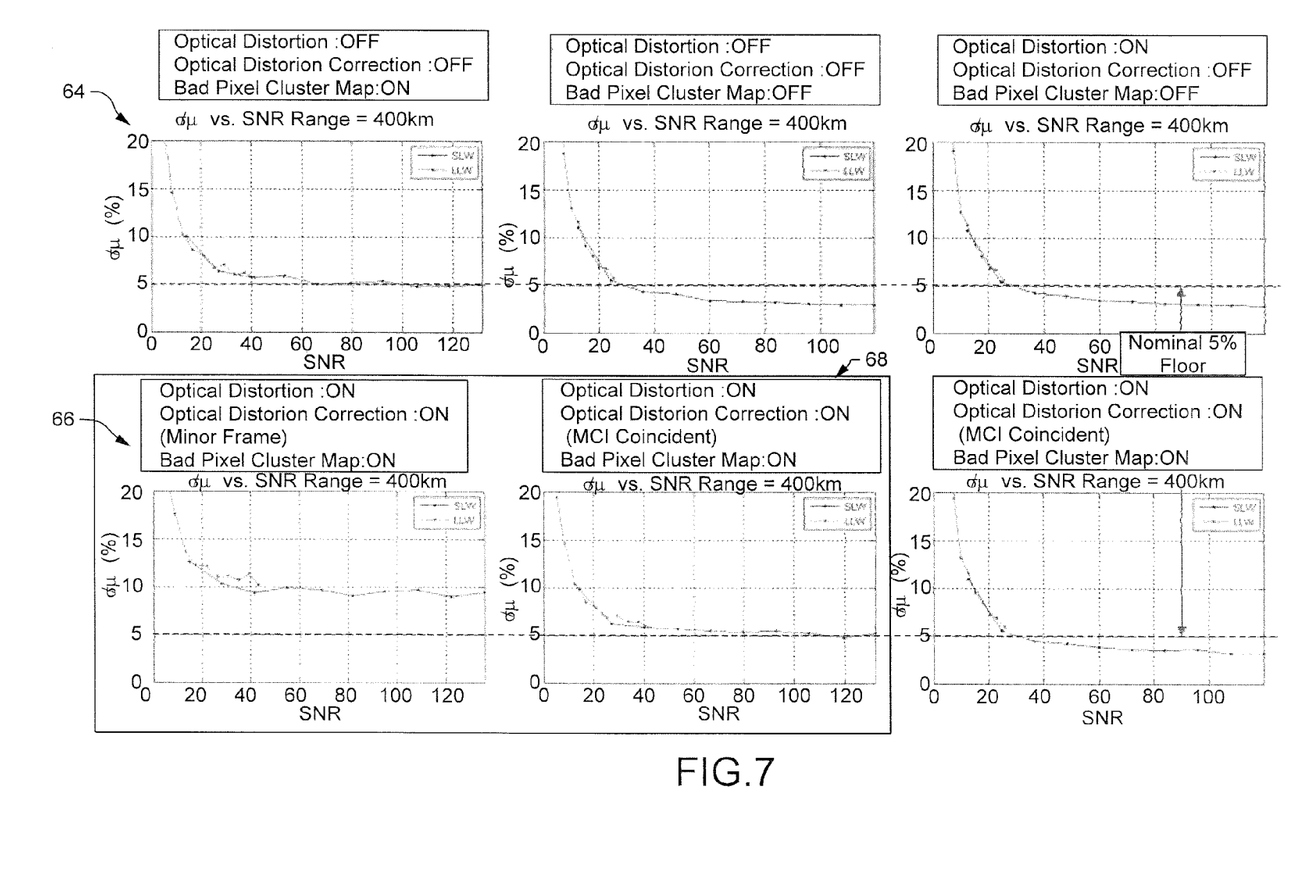
FIG. 7 is a graphical view of computer simulated results analyzing variance-to-mean ratio versus SNR.

Improved error reduction was also confirmed by computer simulation using the variance-to-mean ratio ($\sigma/\mu$) versus SNR summary at a fixed range, as shown in FIG. 7. The variance-to-mean ratio ($\sigma/\mu$) characterizes error fluctuation behavior relative to the mean value of the measurement, with large values indicating large measurement errors and small values indicating increased accuracy. SNR values were computed for the injected objects of known and varying intensities at a constant test range (distance). Variance-to-mean ratio ($\sigma/\mu$) values were computed for each SNR set and plotted against corresponding SNR values. In addition, bad or inoperable pixels were included in order to ensure no direct connection to such effects.

As shown in plot 64 of FIG. 7, no optical distortion or nominal performance resulted in an approximately five percent (5%) floor. The floor is the constant variance-to-mean ratio ($\sigma/\mu$) value that is reached when SNR becomes sufficiently high to provide reliable intensity measures. The nominal performance in plot 64 represented the best possible outcome result. As shown in plot 66, double interpolation, or independent optical distortion correction and MCI re-registration processes, resulted in an approximately ten percent (10%) floor, which increased five percent (5%) over the nominal performance. As shown in plot 68, optical distortion correction applied coincident with MCI re-registration via a single interpolation resulted in a five percent (5%) floor, or return to nominal performance. Thus, independent optical distortion correction and MCI re-registration processes resulted in a floor that was twice as high as the floor resulting from the combined optical distortion and MCI re-registration process.

INDUSTRIAL APPLICABILITY

In general, the foregoing disclosure finds utility in various applications relating to imaging and tracking systems. In particular, the disclosed systems and techniques may be used to enhance a signal-to-noise ratio (SNR) of an imaging and tracking system with motion compensated integration (MCI). For example, the disclosed systems and techniques may be employed in, but not limited to, missile defense kill vehicles, missiles, satellites, space vehicles, air vehicles, aircraft, ground vehicles, watercraft, and for other applications for use in both military and civilian environments.

By implementing the disclosed systems and techniques to a MCI system, a cost-effective and efficient solution for increasing the SNR of the MCI system is provided. The disclosed system may be easily implemented on a field programmable gate array. In particular, combining optical distortion correction and MCI re-registration into a single step via bi-linear interpolation allows for one resampling process, thereby effectively increasing the SNR. Furthermore, by applying digital techniques to estimate fixed pattern noise, the optical sensor may be continuously re-calibrated for fixed pattern noise suppression. Moreover, the use of infinite impulse response for fixed pattern estimation provides for a continuously evolving estimate of fixed pattern noise over operation time, instead of in disjointed "boxcar" steps. In addition, sub-pixel shifting can account for a more accurate overlay during resampling of the raw frame data.

Figure 8:
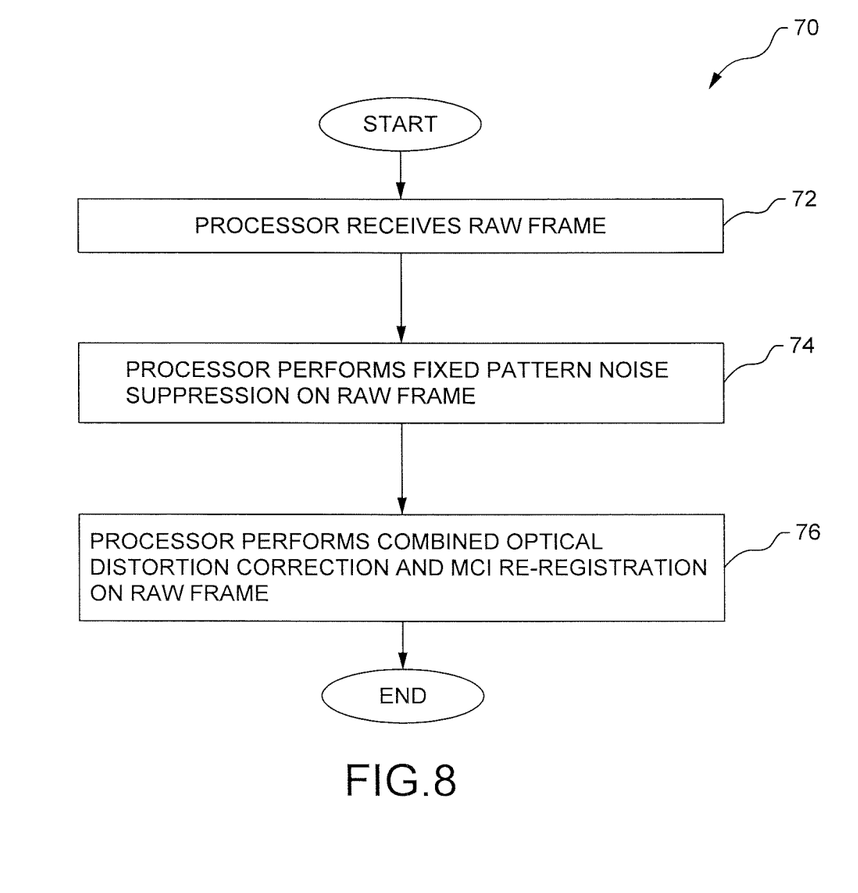
FIG. 8 is a flowchart illustrating a process for improving a signal-to-noise ratio (SNR) for an imaging and tracking system on a moving vehicle platform, in accordance with another embodiment.

Turning now to FIG. 8, with continued reference to FIGS. 1-7, a process 70 for improving SNR for an imaging and tracking system on a moving vehicle platform is shown, in accordance with another embodiment of the present disclosure. At block 72, the processor may receive a raw frame of focal plane array data from the focal plane array. The processor may perform fixed pattern noise suppression on the raw frame of focal plane array data at block 74. At block 76, the processor may perform a combined optical distortion correction and MCI re-registration on the raw frame of focal plane array data.

Figure 9:
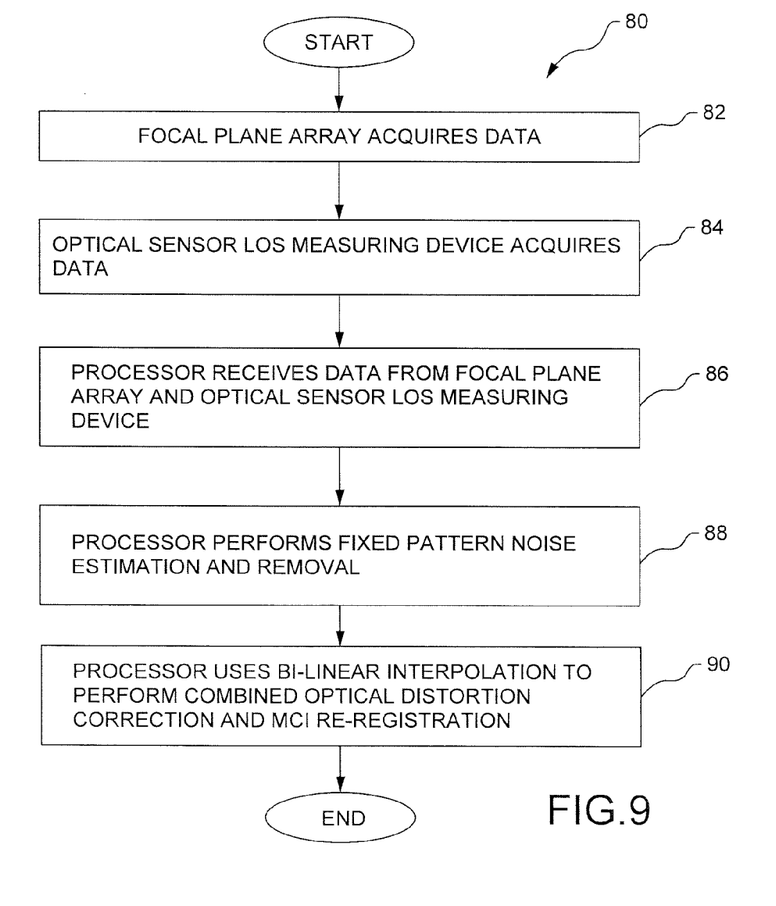
FIG. 9 is a flowchart illustrating a process for increasing SNR for the MCI system of FIG. 1, in accordance with another embodiment.

A process 80 for increasing SNR for an MCI system is shown in FIG. 9, in accordance with yet another embodiment of the present disclosure. At block 82, the focal plane array may acquire focal plane array data. At block 84, the optical sensor line-of-sight (LOS) measuring device may acquire optical sensor LOS movement data. The processor may receive the focal plane array data and the optical sensor LOS movement data, at block 86. The processor may perform fixed pattern noise estimation and removal on the focal plane array data, at block 88. At block 90, the processor may use bi-linear interpolation on the focal plane array data to perform a combined optical distortion correction and MCI re-registration based at least in part on the optical sensor LOS movement data.

It is to be understood that the flowcharts in FIGS. 8 and 9 are shown and described as examples only to assist in disclosing the features of the disclosed system, and that more steps than that shown may be included in the methods corresponding to the various features described above for the disclosed system without departing from the scope of the disclosure.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A motion compensated integration (MCI) system, comprising:
   a moveable platform;
   an optical sensor mounted to the moveable platform, the optical sensor including:
   a set of optics, and
   a focal plane array configured to detect infrared wavelengths focused through the set of optics, and generate focal plane array data;
   an optical sensor line-of-sight measuring device configured to generate optical sensor line-of-sight movement data; and
   a processor in communication with the optical sensor and the optical sensor line-of-sight measuring device, the processor configured to simultaneously correct optical distortion from the set of optics and perform MCI re-registration based on the focal plane array data and the optical sensor line-of-sight movement data.

2. The MCI system of claim 1, wherein the processor is further configured to use bi-linear interpolation to simultaneously correct optical distortion and perform MCI re-registration.

3. The MCI system of claim 2, wherein the processor is further configured to sample a raw frame of focal plane array data.

4. The MCI system of claim 3, wherein the processor is further configured to re-sample the raw frame of focal plane array data only once to account for both optical distortion correction and MCI re-registration.

5. The MCI system of claim 4, wherein the processor is further configured to perform sub-pixel shifting of the raw frame of focal plane array data.

6. The MCI system of claim 5, wherein re-sampling of the raw frame of focal plane array data only once to account for both optical distortion correction and MCI re-registration increases a signal-to-noise ratio of the MCI system.

7. The MCI system of claim 6, wherein the processor is further configured to perform fixed pattern noise estimation and removal before simultaneously correcting optical distortion and performing MCI re-registration.

8. The MCI system of claim 7, wherein the processor is further configured to perform digital fixed pattern filtering.

9. The MCI system of claim 8, wherein the processor is further configured to use infinite impulse response filtering to estimate fixed pattern noise.

10. The MCI system of claim 9, wherein the processor is further configured to perform MCI integration in order to produce a master frame.

11. The MCI system of claim 10, wherein the processor is implemented as part of a field programmable gate array.

12. The MCI system of claim 11, wherein the focal plane array is comprised of at least one of long band detectors and short band detectors.

13. The MCI system of claim 11, wherein the focal plane array is comprised of visible detectors.

14. A method for improving a signal-to-noise ratio for an imaging and tracking system on a moving vehicle platform, the imaging and tracking system including a focal plane array and a processor, the method comprising:
   the processor receiving a raw frame of focal plane array data from the focal plane array;

the processor performing fixed pattern noise suppression on the raw frame of focal plane array data; and the processor performing a combined optical distortion correction and motion compensated integration (MCI) re-registration on the raw frame of focal plane array data.

15. The method of claim 14, further comprising the processor using bi-linear interpolation to perform the combined optical distortion correction and MCI re-registration.

16. The method of claim 15, further comprising the processor performing sub-pixel shifting of the raw frame of focal plane array data.

17. The method of claim 16, further comprising the processor using infinite impulse response filtering.

18. A method for increasing a signal-to-noise ratio for a motion compensated integration (MCI) system including an optical sensor mounted on a moveable platform, an optical sensor line-of-sight measuring device, and a processor in communication with the optical sensor and the optical sensor line-of-sight measuring device, the optical sensor including a set of optics and a focal plane array, the method comprising:

the focal plane array acquiring focal plane array data;

the optical sensor line-of-sight measuring device acquiring optical sensor line-of-sight movement data;

the processor receiving the focal plane array data and the optical sensor line-of-sight movement data;

the processor performing fixed pattern noise estimation and removal on the focal plane array data; and the processor using bi-linear interpolation on the focal plane array data to perform a combined optical distortion correction and MCI re-registration based at least in part on the optical sensor line-of-sight movement data.

19. The method of claim 18, further comprising the processor performing MCI integration on the focal plane array data in order to produce a master frame.

20. The method of claim 19, further comprising the processor performing infinite impulse response filtering for the fixed pattern noise estimation.

* * * * *